US006957820B1

(12) United States Patent
Stefani

(10) Patent No.: US 6,957,820 B1
(45) Date of Patent: Oct. 25, 2005

(54) LICENSE PLATE RELOCATING BRACKET

(76) Inventor: Franco Stefani, 841 NE. 61st St., Fort Lauderdale, FL (US) 33334

( * ) Notice: Subject to any disclaimer, the term of this patent is extended or adjusted under 35 U.S.C. 154(b) by 0 days.

(21) Appl. No.: 10/879,240

(22) Filed: Jun. 29, 2004

(51) Int. Cl.7 ............................................. G09F 13/02

(52) U.S. Cl. ...................... 280/284; 280/288.4; 40/209

(58) Field of Search ................................ 280/284, 283, 280/285, 288, 288.4, 304.5; 180/227; 40/209, 40/211; D20/13

(56) References Cited

U.S. PATENT DOCUMENTS

| 5,228,223 | A | * | 7/1993 | Lan ............................. 40/204 |
| 5,503,420 | A | * | 4/1996 | Consiglio et al. ......... 280/288.4 |
| 5,713,653 | A | * | 2/1998 | White et al. ................ 362/473 |
| 6,324,778 | B1 | * | 12/2001 | Gall ............................ 40/594 |
| D464,866 | S | | 10/2002 | Switz et al. |
| 6,592,137 | B2 | | 7/2003 | Grove |
| 2004/0079009 | A1 | * | 4/2004 | Arrua .......................... 40/204 |

FOREIGN PATENT DOCUMENTS

JP 2004-276662 * 10/2004 ............ B62J 39/00

OTHER PUBLICATIONS

Creamy Chrome, Website, Jan. 8, 2004, www.creamychrome.com.*

* cited by examiner

Primary Examiner—Avraham Lerner
(74) Attorney, Agent, or Firm—M. K. Silverman

(57) ABSTRACT

In a wheel assembly of a motorcycle having a swing arm including a chain guard, positioned axially outwardly of a sprocket and an axle assembly locking element and further including a rear wheel hub bearing mounted upon an axle, a chain and sprocket secured to an outer radial face of the hub, and a chain drive mounted in rotational relationship to an engine of the motorcycle. Rearward of the assembly, the novel license plate relocating bracket includes an elongate bracket arm having a plane substantially parallel with the plane of the swing arm and an aperture in a forward end. The aperture is proportioned for engagement about the axle of the wheel assembly. A locking element secures an area of the bracket arm about the aperture of the wheel assembly. The license plate mounting surface is generally curved about the sprocket and the surface transcribing a segment of a surface of rotation sufficient to accommodate a length of the license plate having and an axial width sufficient to accommodate the width of the license plate and the mounting surface includes slots to facilitate securement of a license plate thereto.

10 Claims, 5 Drawing Sheets

LICENSE PLATE RELOCATING BRACKET

BACKGROUND OF THE INVENTION a. Area of Invention

The present invention relates to motorcycles.

b. Prior Art

In the art of motorcycles, motorbikes, and the like, users and riders thereof often prefer to move the position of the motorcycle license plate to change the aesthetics of the rear end of the motorcycle, as well as to protect the chain of the motorcycle. A typical location of the license plate relocating bracket 10 upon a motorcycle 12 is shown in FIG. 1. The terms cycle and motorcycle as used herein denotes motorbikes, mopeds, cycles, and the like.

The instant invention is directed to an improvement in placement of the conventional motorcycle license plate placement to provide improved protection of the chain and to provide aesthetics for the rear portion of the motorcycle.

The license plate relocating bracket has been addressed in the prior art in terms of placement on different areas of the motorcycle, as may be noted in U.S. Pat. No. 6,592,137 B2 to Grove and U.S. Design Pat. No. 464,866 to Switz et al. The instant invention, while providing a novel aesthetic, also furnishes important and inventive differences of function and structure.

SUMMARY OF THE INVENTION

In a wheel assembly of a cycle, including a rear wheel hub bearing mounted upon an axle, having a sprocket secured to an outer radial face of said hub and chain drive mounted to the sprocket, said chain drive in rotational relationship to an engine of the cycle. The assembly further including a swing arm positioned axially outwardly of the chain plate and an axle assembly locking means. The novel cycle relocating bracket comprises an elongate bracket arm defining a plane substantially parallel with that of said swing arm and an aperture in a forward end thereof. The aperture is proportioned for engagement about said axle of the wheel assembly, in which said locking means secures an area of said bracket arm, about the aperture, to the wheel assembly. The license plate mounting surface is generally curved about the sprocket and its surface transcribes a segment of a surface of rotation sufficient to accommodate a length of the license plate. The mounting surface includes an axial width sufficient accommodate a width of the license plate and the mounting surface includes slots to facilitate securement of a license plate thereto. A web integrally joins a rear portion of the bracket arm and an inner surface of the plate mounting surface in a plane radially outwardly of the chain drive.

The relocating bracket, including a horizontal member thereof, defines a range of between about 9 to about 12 centimeters. The relocating bracket, including the elongate bracket arm, includes a plane substantially parallel to outer vertical surfaces of said cycle. The relocating bracket also includes a locking means having a lock nut having an engagement site length in a range of about 4 to about 8 centimeters. The lock nut engagement site exhibits a width in a range of about 1 to about 4 centimeters. The relocating bracket integrates the bracket arm to the mounting surface and comprises two curved elongate elements separated by a void space.

It is accordingly an object of the invention to provide a motorcycle license plate relocating bracket having functions of protecting the chain, visibility, and aesthetics to an external observer thereof.

Another object is to protect the chain drive and rider from pebbles, dirt, and mud lifted from the ground while driving.

It is a still further object to protect the driver of the cycle by preventing his clothing from entanglement with the chain when the cycle is in motion.

The above and yet other objects and advantages of the present invention will become apparent from the hereinafter set forth Brief Description of the Drawings, Detailed Description of the Invention, and claims appended herewith.

DETAILED DESCRIPTION OF THE INVENTION

Figure 1:
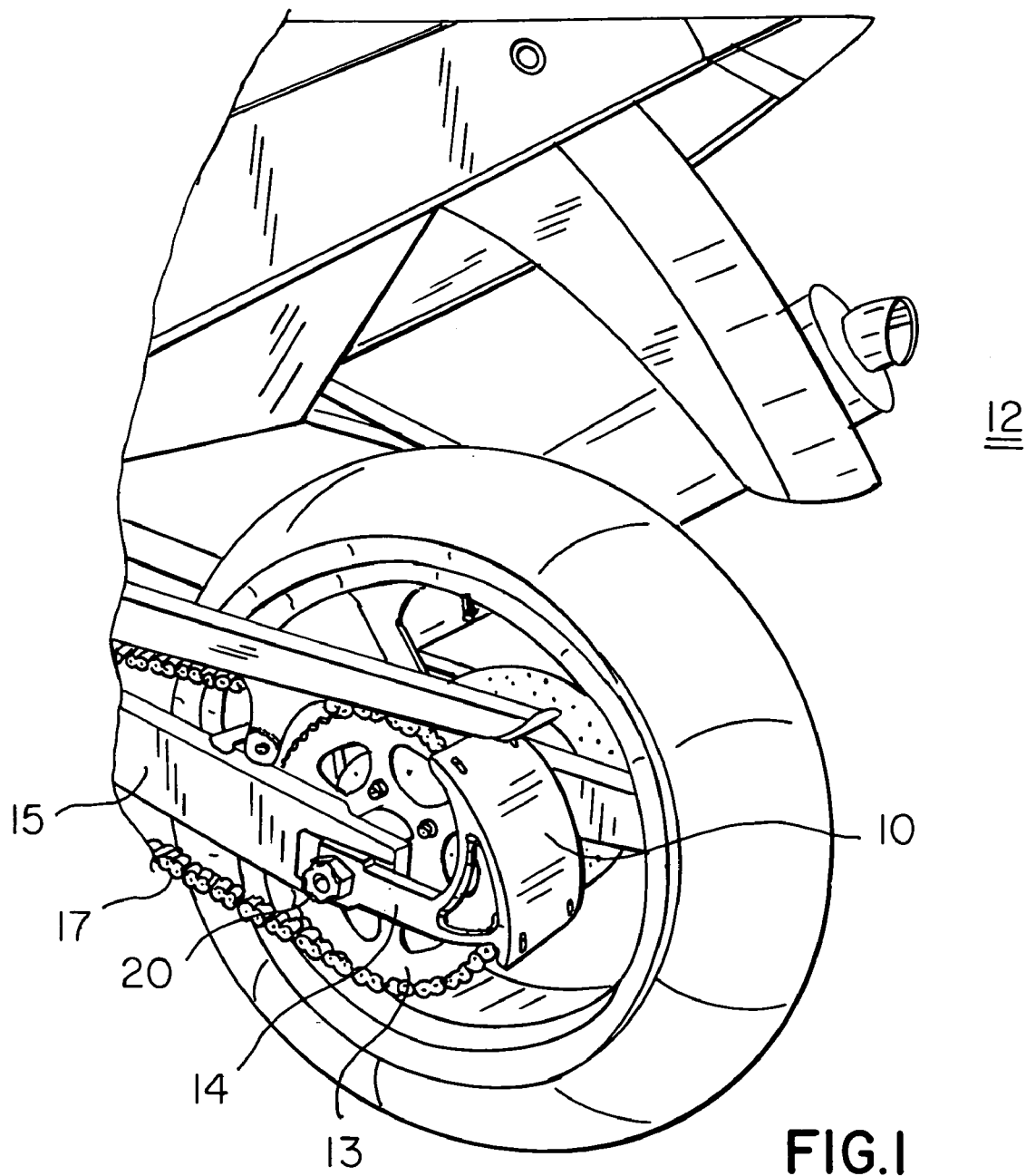
FIG. 1 is a perspective view of a rear portion of a motorcycle showing the general geometry and position of the inventive license plate relocating bracket.
Figure 2:
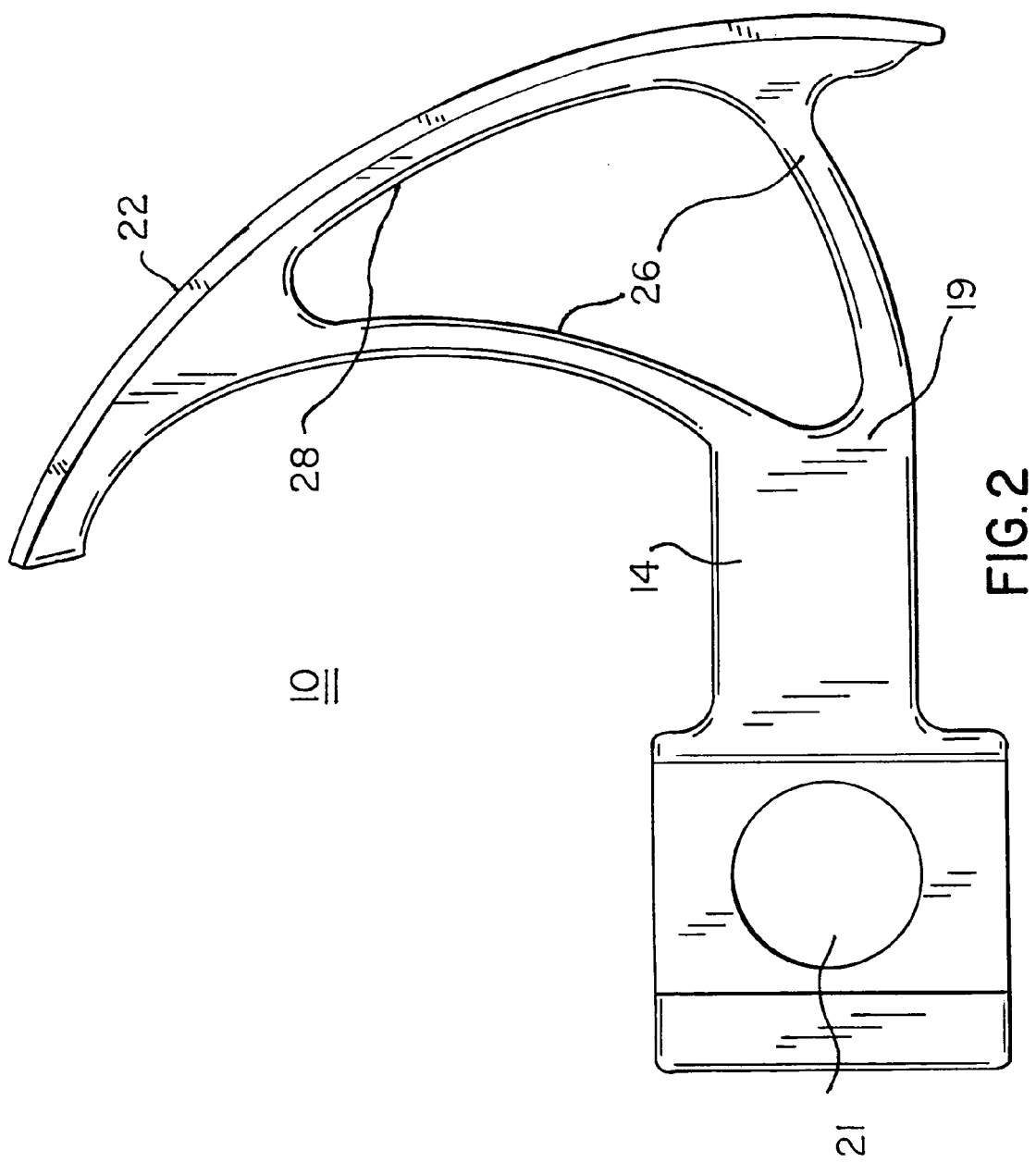
FIG. 2 is a perspective view of the license plate relocating bracket illustrating its placement parallel to the swing arm or horizontal surfaces of the cycle.

With reference to FIG. 1 there is shown, in perspective view, a license plate relocating bracket 10, the position of which relative to a cycle 12 is also shown. In FIG. 2 may be seen the general geometry of the inventive license plate relocating bracket, curved about a sprocket 13. Slots 11 enable securement of a license plate 24 to said relocating bracket 10 may also be seen in FIGS. 3–4.

Figure 5:
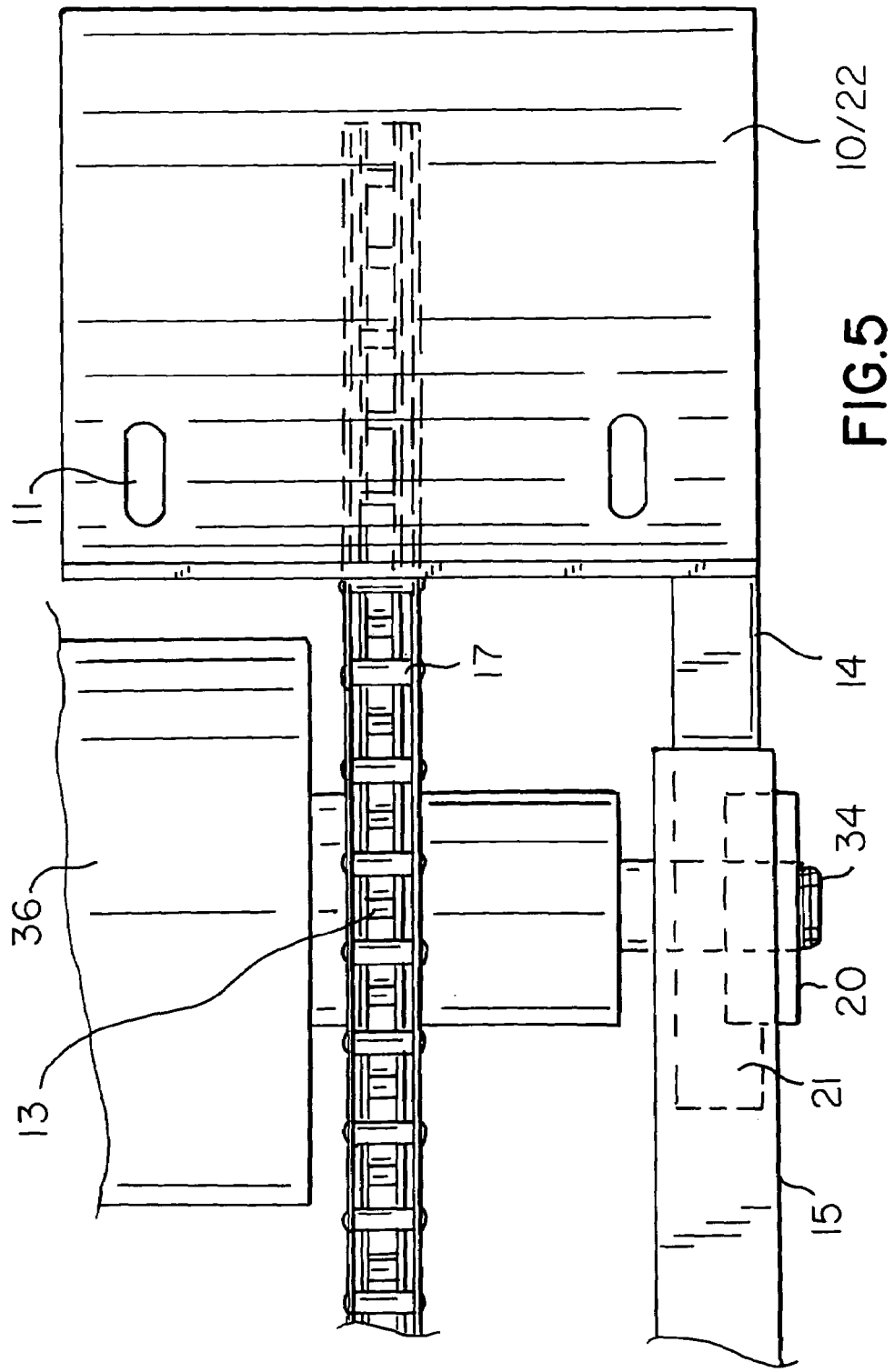
FIG. 5 is a perspective, exploded view of the cycle wheel hub, axle, chain, and sprocket with the inventive license plate relocating bracket secured with a locking means.

A rear wheel assembly 18 of said cycle 12 includes a rear wheel hub bearing 36 mounted upon an axle 34. A chain 17 is mounted to said sprocket 13. See FIGS. 3 and 5.

Figure 3:
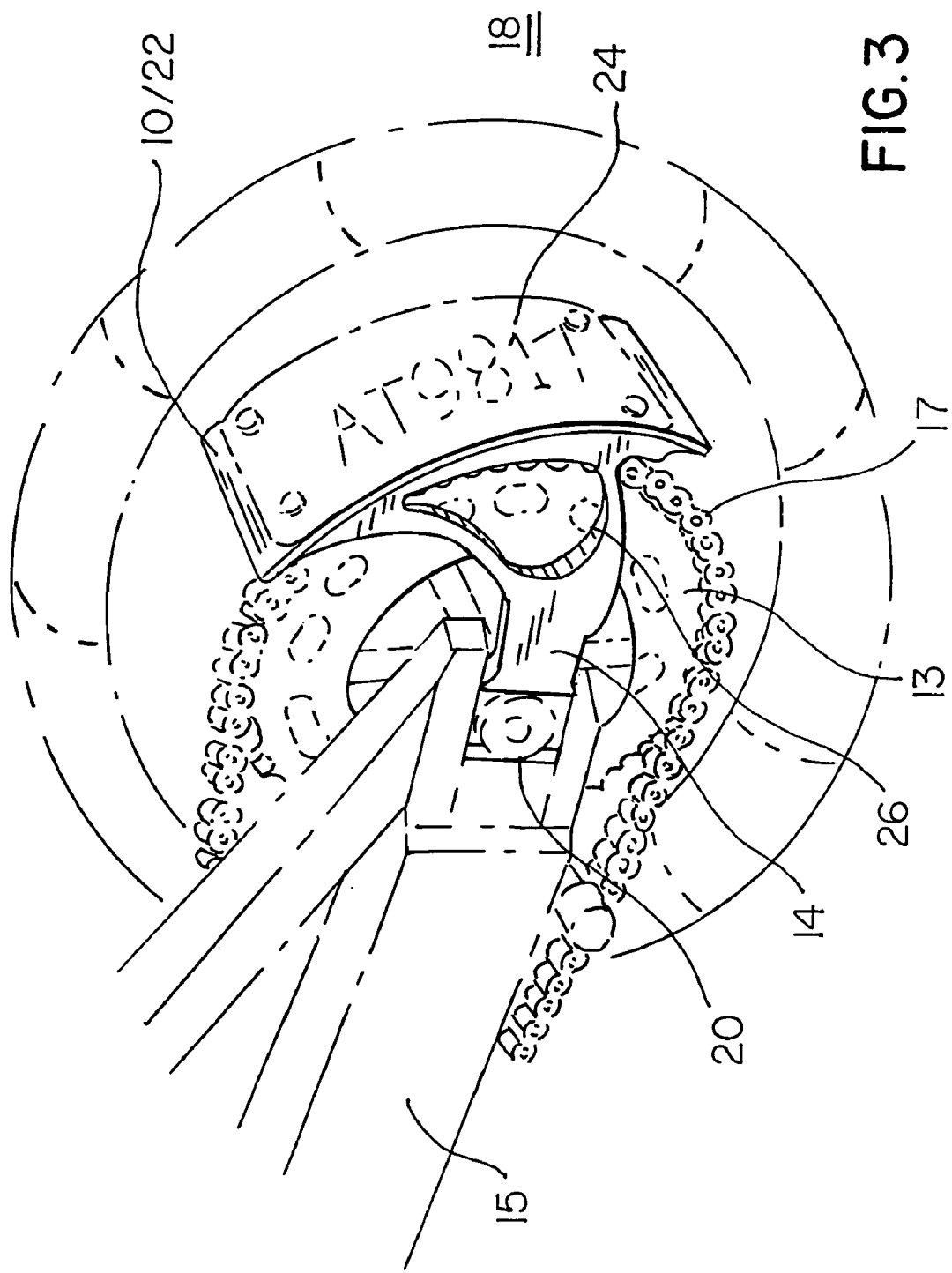
FIG. 3 is a perspective view of the rear portion of the motorcycle with an exemplary license plate secured to the inventive license plate relocating bracket.
Figure 4:
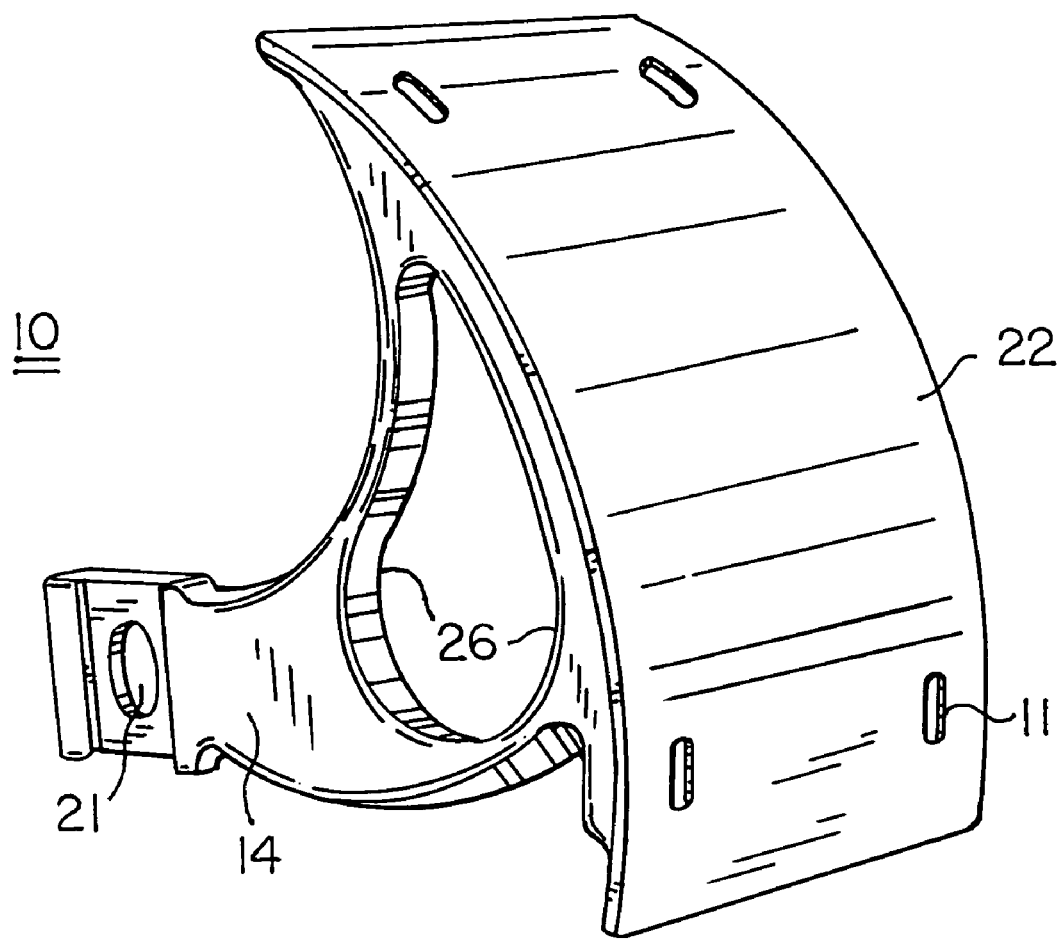
FIG. 4 is a perspective view of the license plate relocating bracket.

An elongate bracket arm 14 of said relocating bracket 10 includes an opening 16 proportional for engagement about said axle 34 of said wheel assembly 18. See FIG. 3. Attachments to a swing arm 15, or an alternate plane substantially parallel to outer vertical surfaces of said cycle, is facilitated by locking means 20, as shown in FIGS. 1 and 3.

Said locking means may be seen in FIG. 1 as a lock nut. Locking means 20 secures an area of said elongate bracket arm 14 about an aperture 21 to said swing arm 15, axle 34 and wheel assembly 18. See FIGS. 2 and 3. Alternatively, locking means 20 may be seen in FIG. 5 as a lock nut on the opposite side of the axle 34 tightening elongate bracket arm 14 into place on the wheel assembly 18. In this instance, the elongate bracket arm 14 engages said aperture 21 replacing the cycles adjusting block.

A curved license plate mounting surface 22 provides a surface large enough to accommodate the length and width of said cycle license plate 24. In FIG. 3 may be seen said curved license plate mounting surface 22 with said license plate 24 secured by slots 11 to said license plate relocating bracket 10.

A web 26 integrally connects to said rear portion 19 of said bracket arm 14 and an inner surface 28 of said mounting plate bracket 22, providing aesthetic placement of the cycle license plate. See FIGS. 2 and 3. An integrated joining of the elongate bracket arm 14 to said mounting surface 22 is affected by two curved elongate elements 26 separated by a void space 26.

Resultant of the above, there is achieved a license plate relocating bracket which not only changes the aesthetics of the rear portion of the cycle but, as well, serves to guard and protect said chain 17 that is mounted on said sprocket 13 secured to said axle 34 of said hub 36 of said rear wheel assembly 18 of the cycle (FIG. 5), thus minimizing the possibility of clothing becoming caught in the chain.

While there has been shown and described the preferred embodiment of the instant invention it is to be appreciated that the invention may be embodied otherwise than is herein specifically shown and described and that, within said embodiment, certain changes may be made in the form without departing from the underlying ideas or principles of this invention as set forth in the claims appended herewith.

What is claimed is:

1. In a wheel assembly of a cycle, including a rear wheel hub bearing mounted upon an axle, a sprocket secured to an outer radial face of said hub and a chain drive mounted to said sprocket and in rotational relationship to an engine of said cycle, said assembly further including a swing arm positioned axially outwardly of said chain plate and an axle assembly locking means, a cycle license plate relocating bracket comprising:
    (a) an elongate bracket arm having a plane substantially parallel with a plane of said swing arm and an aperture in a forward end thereof, said aperture proportioned for engagement about said axle of said wheel assembly, in which said locking means secures an area of said bracket arm about said aperture to said axle and wheel assembly;
    (b) a curved license plate mounting surface generally curved about said sprocket, said surface
        (i) transcribing a segment of a surface of rotation sufficient to accommodate a length of said license plate; and
        (ii) having a axial width sufficient to accommodate width of said plate; said mounting surface including slots to facilitate securement of a license plate thereto; and
    (c) a web integrally joining a rear portion of said bracket arm and an inner surface of said plate mounting surface in a plane radially outwardly of said chain drive.

2. The relocating bracket as recited in claim 1, in which said elongate bracket arm includes a horizontal member, a forward portion of which includes said aperture.

3. The relocating bracket as recited in claim 2, in which said relocating bracket including said horizontal member defines a length in a range of between about 9 to about 12 centimeters.

4. The relocating bracket as recited in claim 1, in which said elongate bracket arm includes an axis substantially parallel to outer vertical surfaces of said cycle.

5. The relocating bracket as recited in claim 1, in which said elongate bracket arm and engagement site replaces an adjusting block.

6. The relocating bracket as recited in claim 1, in which said integral joining of said bracket arm to said mounting surface comprises two curved elongate elements separated by a void space.

7. In a wheel assembly of a cycle, including a rear wheel hub bearing mounted upon an axle, a sprocket secured to an outer radial face of said hub and a chain drive mounted to said sprocket and in rotational relationship to an engine of said cycle, said assembly further including a swing arm positioned axially outwardly of said chain plate, a cycle license plate relocating bracket comprising:
    (a) an axle assembly locking means for said wheel assembly;
    (b) an elongate bracket arm having a plane substantially parallel with a plane of said swing arm and an aperture in a forward end thereof, said aperture proportioned for engagement about said axle of said wheel assembly, in which said locking means secures an area of said bracket arm about said aperture to said axle and wheel assembly;
    (c) a curved license plate mounting surface generally curved about said sprocket, said surface
        i. transcribing a segment of a surface of rotation sufficient to accommodate a length of said license plate; and
        ii. having a axial width sufficient to accommodate width of said plate; said mounting surface including slots to facilitate securement of a license plate thereto; and
    (d) a web integrally joining a rear portion of said bracket arm and an inner surface of said plate mounting surface in a plane radially outwardly of said chain drive.

8. The relocating bracket as recited in claim 7, in which said locking means comprises a lock nut having an engagement site length in a range of about 4 to about 8 centimeters.

9. The relocating bracket as recited in claim 7, in which said locking means comprises a lock nut having an engagement site on the opposite side of said wheel assembly, locking said axle into place.

10. The relocating bracket as recited in claim 7, in which said lock nut engagement site exhibits a width of about 1 to about 4 centimeters.

* * * * *